UNITED STATES PATENT OFFICE.

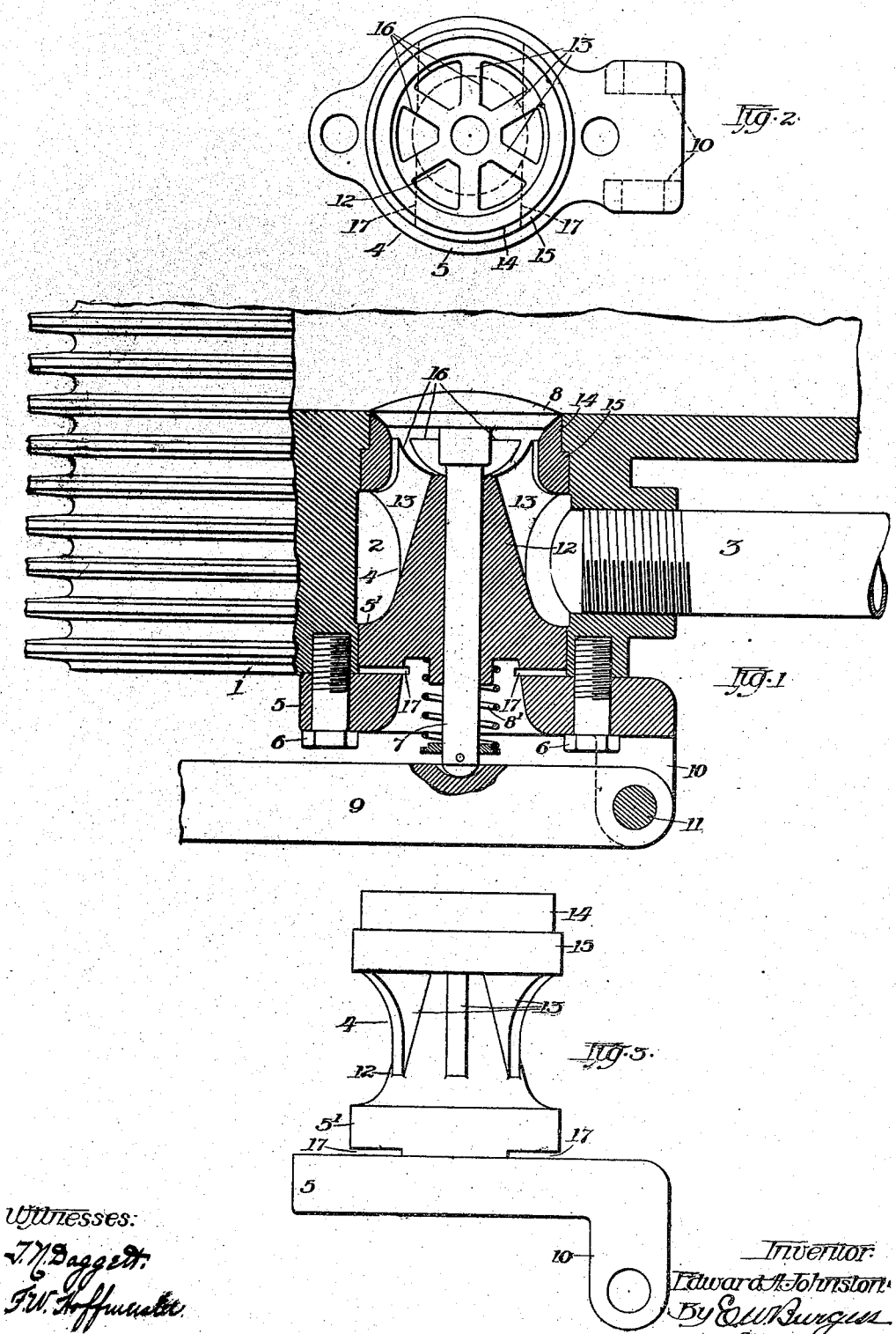

EDWARD A. JOHNSTON, OF STERLING, ILLINOIS, ASSIGNOR TO INTERNATIONAL HARVESTER COMPANY, A CORPORATION OF NEW JERSEY.

VALVE-CAGE FOR GAS-ENGINES.

No. 892,994.　　　Specification of Letters Patent.　　Patented July 14, 1908.

Application filed June 8, 1907. Serial No. 377,857.

*To all whom it may concern:*

Be it known that I, EDWARD A. JOHNSTON, a citizen of the United States, residing at Sterling, in the county of Whiteside and State of Illinois, have invented certain new and useful Improvements in Valve-Cages for Gas-Engines, of which the following is a specification.

My invention relates to gas engines in general, and particularly to the manner of mounting the intake and exhaust valves in connection therewith, and consists in a removable cage adapted to be secured to the engine cylinder and in which the valve proper is mounted; the object of my invention being to provide a valve cage so constructed as not to be warped or otherwise distorted under the influence of the excessive heat to which such parts are subjected, such distortion frequently impairing the efficiency of the valve by causing its stem to bind in its bearing and the valve to be imperfectly received by its seat. Also to provide a valve cage that, when secured in position, will not be affected by the heat in a manner to subject the securing means to undue or unequal strains; which objects are attained by the mechanism illustrated in the accompanying drawing, in which—

Figure 1 is a sectional plan view of the valve cage and a portion of a cylinder head with a valve mounted in the cage. Fig. 2 is an end view of the cage; and Fig. 3 is a detached side elevation of the same.

Like reference numerals designate the same parts throughout the several views.

1 is an end portion of an engine cylinder, and 2 is an opening therein communicating with its interior and having a pipe 3 leading therefrom, which in this illustration represents the exhaust channel. 4 is a valve cage received by said opening, having an outer flange portion 5, by which it may be secured to the wall of the cylinder by means of bolts 6, and a collar portion $5^1$ engaging with the wall of the opening, and it is provided with a central bore adapted to receive the stem 7 of a mushroom valve 8 suitably seated upon the inner end of the cage; the stem being surrounded at its outer end by a coiled spring $8^1$ operative in a common way to retain the valve in engagement with its seat; and 9 represents a valve lever which is preferably pivoted between outwardly projecting ears 10 integral with the flange 5, by means of a pivot pin 11.

The cage is provided with an inwardly tapering conical core 12, having radially projecting ribs 13 extending outward therefrom and forming longitudinal channels thereon that register at their inner ends with longitudinal openings in a collar portion 14, having the valve seat at its inner end and provided with a shoulder 15 on its periphery that engages with a corresponding shoulder in the opening 2. The longitudinal openings 16 are in communication with the interior of the cylinder when the valve is lifted from its seat, and they also communicate with the exhaust pipe leading from the annular chamber formed by the conical core and the wall of the opening.

The centrally arranged conical core and its radially arranged ribs present a surface that, when exposed to the excessive heat to which such parts are subjected, will expand equally in all directions and avoid any cramping effect upon the valve stem, and consequently any imperfect seating of the valve proper, or any uneven strain upon the securing bolts. As a further preventive of the latter evil, there are provided narrow parallel chordal channels 17 at the base of the conical core adjacent to the flange portion 5, that extend inward from the openings in the flange for the securing bolts in a manner to lessen the resistance of the cage to yielding under strain at that point.

What I claim as my invention, and desire to secure by Letters Patent, is:

1. A valve cage for explosive engines having, in combination, a central core forming the body of said cage and having peripheral bearing collars at the inner and outer ends thereof adapted to engage with the wall of an opening communicating with a combustion chamber, a flange at the outer end of the cage whereby it may be secured to the engine, a valve seat at its opposite end, an axial bore through said core adapted to receive a valve stem, the inner collar having longitudinal openings therethrough between the valve seat and core and the outer collar having parallel chordal channels therein adjacent to said flange.

2. A valve cage for explosive engines having, in combination, a central conical core forming the body of said cage and having peripheral collars at the base and apex thereof adapted to engage with the wall of an opening communicating with a combustion chamber, a flange surrounding the collar at the base end of said core whereby the cage may be secured to the engine, and a valve seat at its opposite end, an axial bore through said core adapted to receive a valve stem, the collar at the apex of said core having longitudinal openings therethrough between the valve seat and core and radial ribs extending lengthwise of said core and forming longitudinal channels thereon that register with said openings.

EDWARD A. JOHNSTON.

Witnesses:
LEO J. FORSTER,
CHAS. N. HOSTETTER